United States Patent Office 3,105,407
Patented Oct. 1, 1963

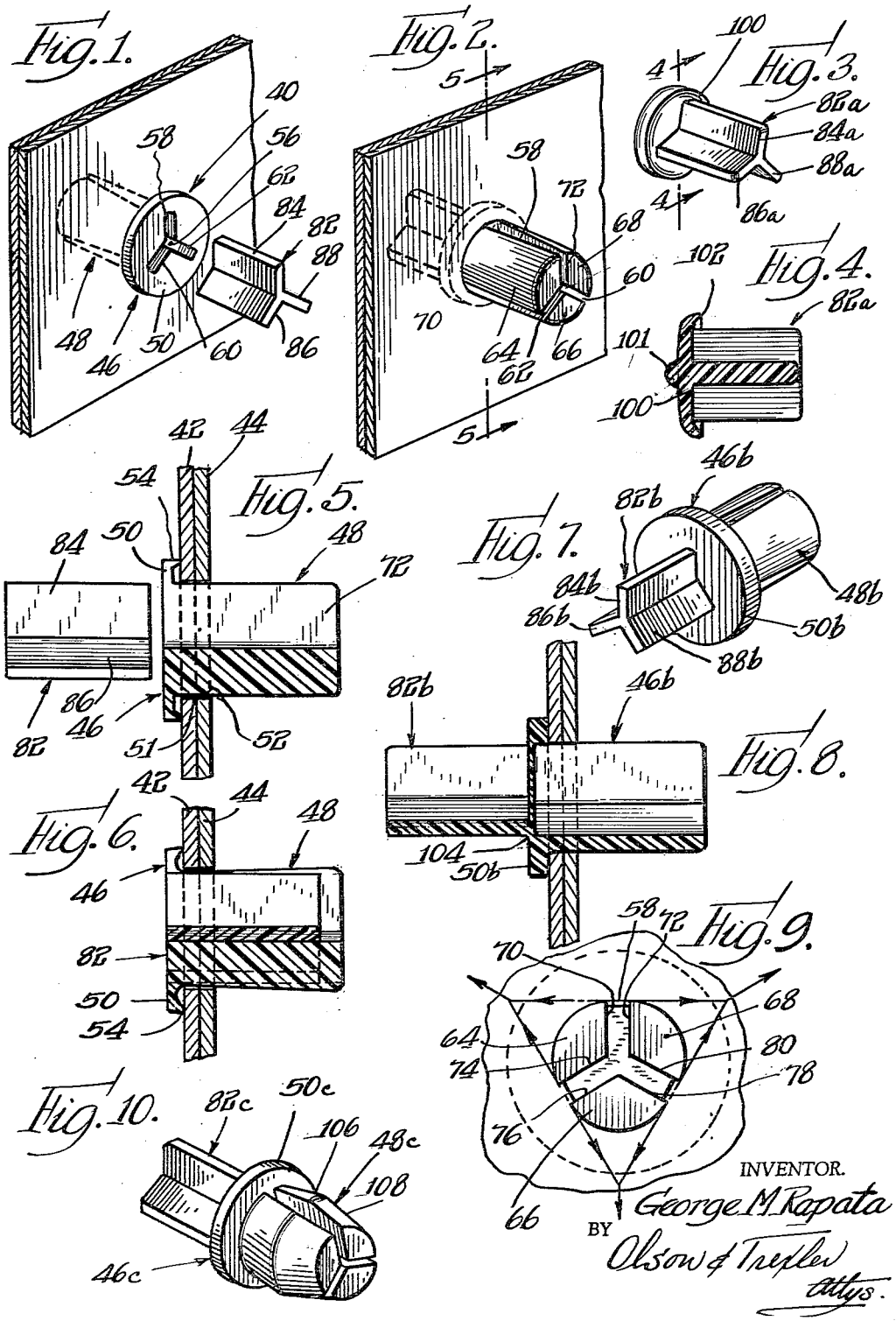

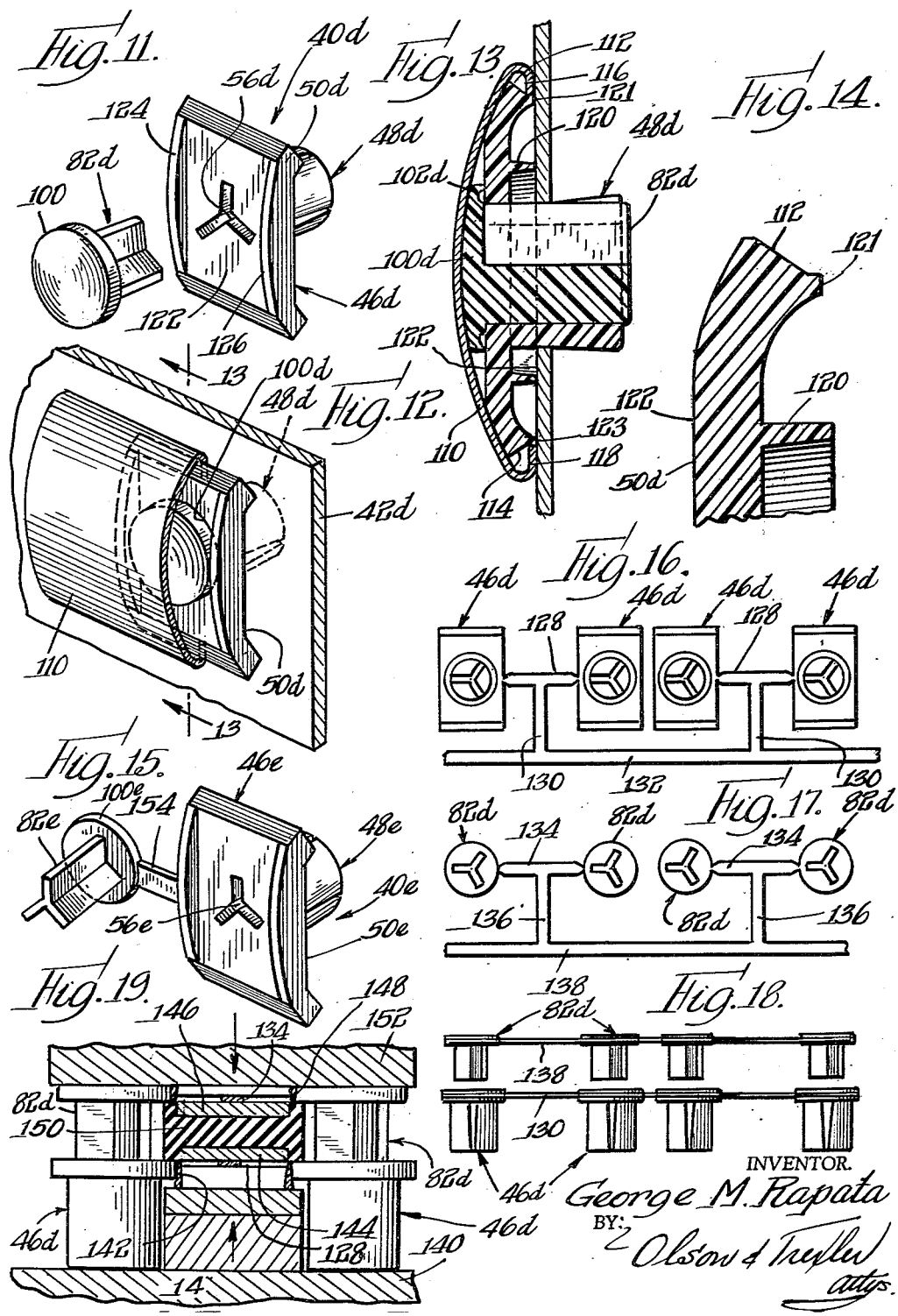

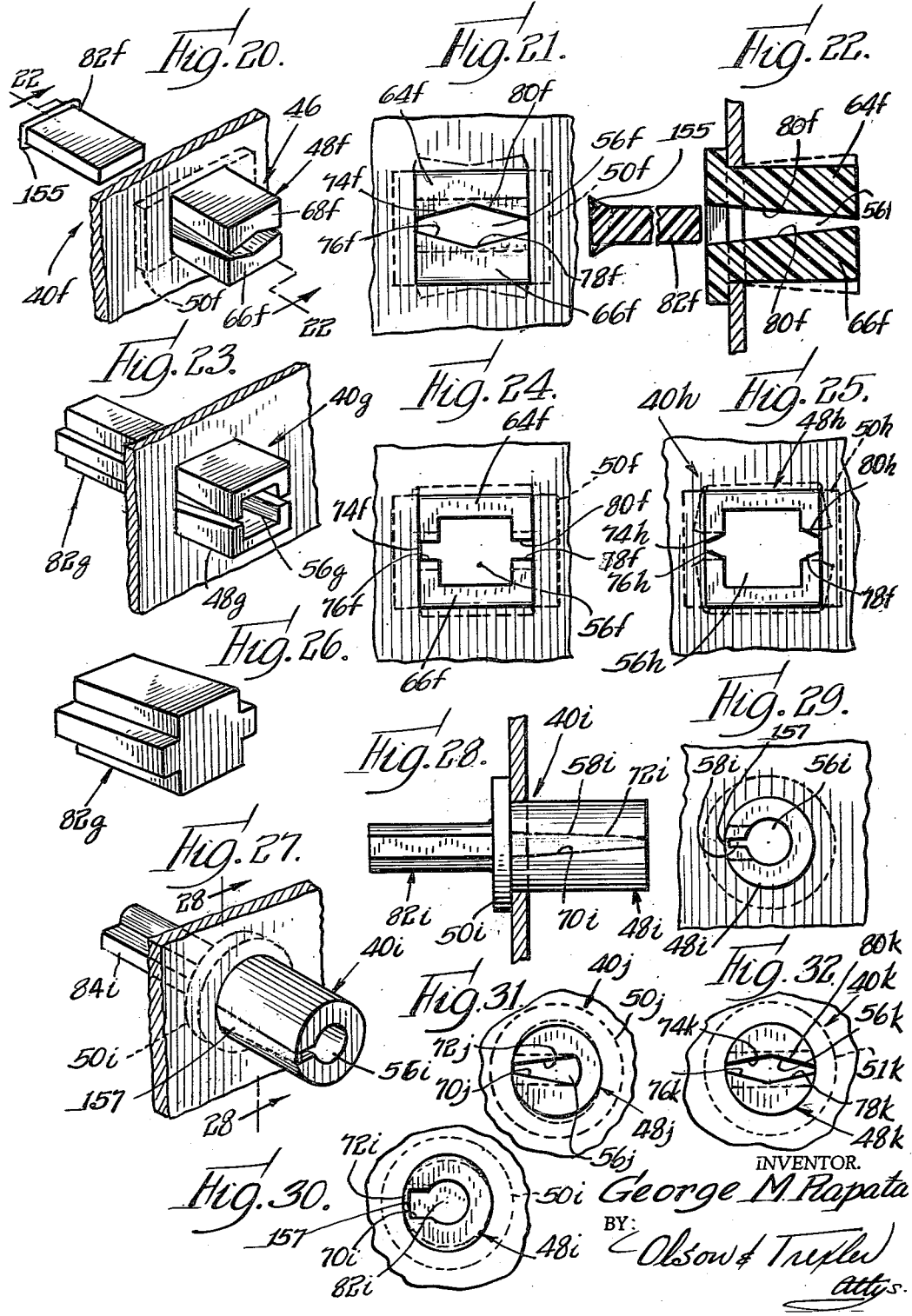

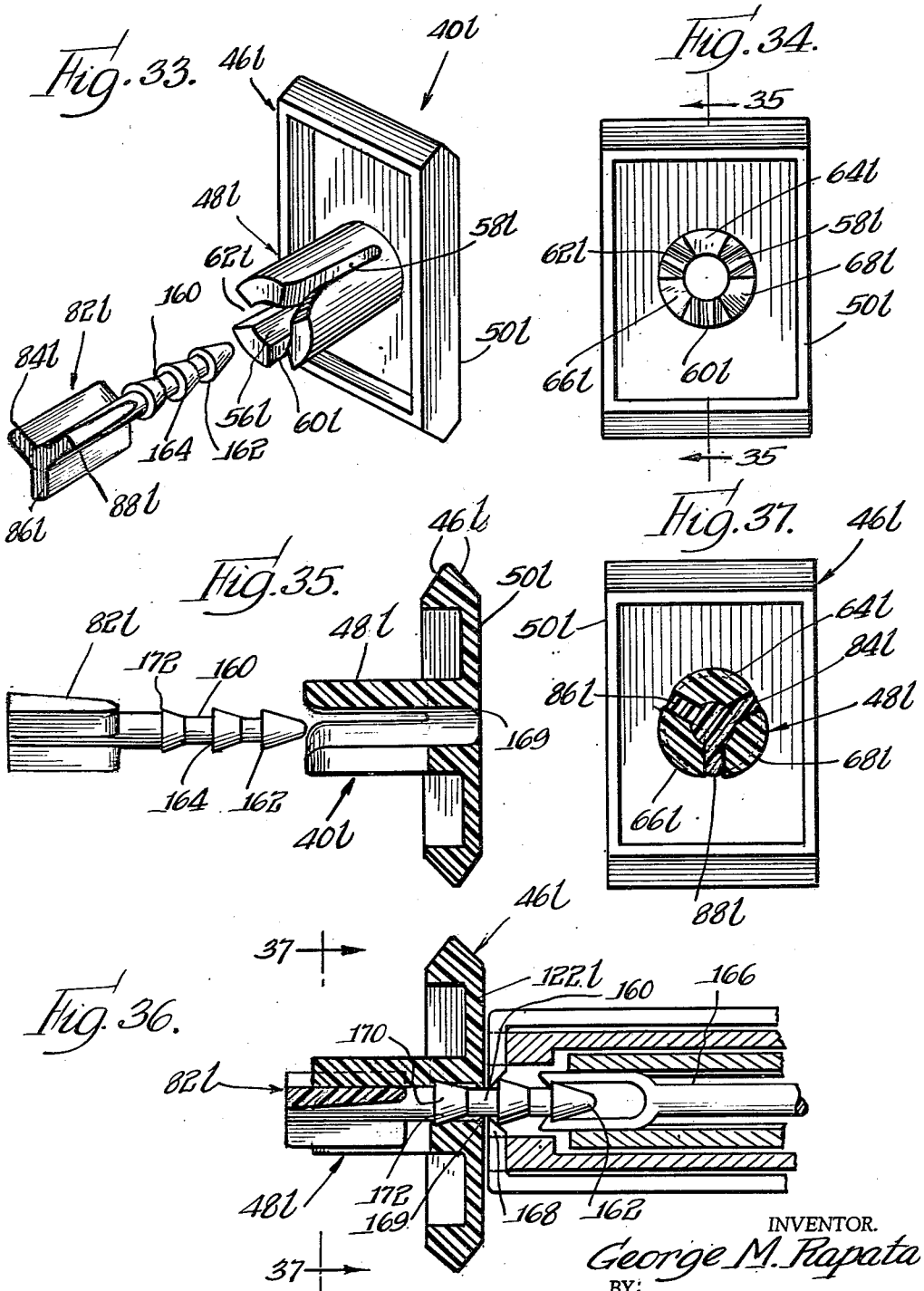

3,105,407
FASTENER
George M. Rapata, Park Ridge, Ill., assignor to Illinois Tool Works Inc., a corporation of Delaware
Filed Mar. 18, 1959, Ser. No. 800,183
6 Claims. (Cl. 85—40)

The present invention relates to a novel fastener device, and more particularly to a novel fastener device or anchor member adapted to be applied to an apertured work structure.

Fastener devices or anchor members have heretofore been suggested which include a circular bore extending axially through a split or slotted shank element insertable into an apertured work structure, and a cylindrical drive pin insertable into the bore for forcing or retaining the shank against the work structure. While certain of these heretofore suggested devices have been generally satisfactory for many uses, it has been found that in the light of the present invention, they do not provide the maximum possible holding power.

It is an important object of the present invention to provide a novel device such as an anchor member or fastener member having an axially split or slotted shank portion insertable into an apertured work structure, which device is constructed so as to improve the holding power thereof.

A further object of the present invention is to provide a novel device having a resilient plastic shank portion insertable into an apertured work structure and a drive pin for insertion into the shank portion, which device is constructed so that the entire periphery of the shank portion will be positively urged outwardly when the drive pin is assembled in a manner which improves the holding power of the device.

A more specific object of the present invention is to provide a novel device such as a fastener or anchor member including a shank portion having axially extending aperture means therein and pin means insertable into the aperture means, which device is constructed so that the pin means substantially completely fills a transverse cross section of the aperture means when fully assembled whereby to resist inward deflection of the entire periphery of the shank portion and thereby improve the holding power of the device.

Still another object of the present invention is to provide a novel device of the above described type which is of simple, rugged and economical construction.

A further object of the present invention is to provide a novel device of the above described type which is capable of sealing an aperture in a work structure to which it is applied.

Other objects and advantages of the present invention will become apparent from the following description and the accompanying drawings wherein:

FIG. 1 is a partially exploded perspective view showing a fastener device incorporating features of the present invention associated with a work structure;

FIG. 2 is another fragmentary perspective view showing the back side of the work structure with the fastening device partially assembled therewith;

FIG. 3 is a perspective view showing a modified drive pin element of a device incorporating features of the present invention;

FIG. 4 is a sectional view taken along line 4—4 in FIG. 3;

FIG. 5 is a sectional view taken along line 5—5 in FIG. 2;

FIG. 6 is a sectional view similar to FIG. 5 but shows the device fully applied to the work structure;

FIG. 7 is a perspective view showing a slightly modified form of a fastening device incorporating features of the present invention;

FIG. 8 is a longitudinal sectional view of the device shown in FIG. 7 partially applied to a work structure;

FIG. 9 is an entering end view showing the device fully assembled with the work structure as in FIG. 6;

FIG. 10 is a perspective view showing a fastening device incorporating another slightly modified form of the present invention;

FIG. 11 is an exploded perspective view showing a device incorporating features of the present invention and especially adapted for retaining molding strips and the like to an apertured work structure or panel;

FIG. 12 is a fragmentary perspective view showing the device of FIG. 11 applied to an apertured panel and retaining a molding strip;

FIG. 13 is an enlarged fragmentary sectional view taken along line 13—13 in FIG. 12;

FIG. 14 is a further enlarged fragmentary sectional view taken along the same line as FIG. 13 and showing a portion of the molding clip of this embodiment in greater detail;

FIG. 15 is a perspective view showing another modified form of the present invention;

FIG. 16 is a plan view showing the manner in which a plurality of the anchor members of FIGS. 11–14 may be molded;

FIG. 17 is a plan view showing the manner in which a plurality of the drive pins of the embodiment shown in FIGS. 11–14 may be molded;

FIG. 18 is an elevational view showing the manner in which a plurality of the drive pins may be simultaneously aligned with a plurality of the anchor members for subsequent assembly;

FIG. 19 is a simplified partial sectional view showing the manner in which a plurality of the drive pins may be simultaneously inserted into a plurality of the anchor members and also the manner in which the devices provided by the anchor members and drive pins may be separated from each other;

FIG. 20 is a perspective view showing another modified form of the present invention partially assembled with an apertured work structure;

FIG. 21 is an entering end view of the device shown in FIG. 20 partially assembled with the work structure;

FIG. 22 is a sectional view taken along line 22—22 in FIG. 20;

FIG. 23 is a fragmentary perspective view similar to FIG. 20 but showing another modified form of the present invention;

FIG. 24 is an entering end view showing the device of FIG. 23 partly applied to the apertured work structure;

FIG. 25 is an entering end view of a device similar to but slightly modified from the embodiment shown in FIGS. 23 and 24;

FIG. 26 is a perspective view showing a drive pin adapted to be used with the embodiments of either FIGS. 23 or 25;

FIG. 27 is a perspective view showing another modified form of the present invention;

FIG. 28 is a partial sectional view taken along line 28—28 in FIG. 27;

FIG. 29 is an entering end view showing the device of FIGS. 27 and 28 partially assembled with a work structure;

FIG. 30 is an entering end view showing the device of FIGS. 27–29 with the drive pin fully inserted;

FIG. 31 is an entering end view of a device similar to but slightly modified from the embodiment shown in FIGS. 27–30;

FIG. 32 is an entering end view showing a device similar to but slightly modified from the embodiment shown in FIGS. 20–22;

FIG. 33 is an exploded perspective view showing a molding clip device incorporating another modified form of the present invention;

FIG. 34 is an inner end view of the device shown in FIG. 33;

FIG. 35 is a sectional view taken along line 35—35 in FIG. 34;

FIG. 36 is a sectional view showing the manner of applying the drive pin to the anchor member or molding clip; and FIG. 37 is a sectional view taken along line 37—37 in FIG. 36.

Referring now more specifically to the drawings wherein like parts are designated by the same numerals throughout the various figures, a fastening device 40 incorporating features of the present invention is shown in FIGS. 1, 2, 5, 6 and 9. While various uses for the fastening device 40 will suggest themselves, it is shown as a fastener for securing a pair of apertured parts 42 and 44 of a work structure for the purpose of illustrating the present invention.

The device 40 comprises a main body member 46 which is formed from a tough resilient material and which preferably is molded from a suitable plastic material such as nylon. The member 46 is provided with a shank portion 48 insertable through the aligned apertures 51 and 52 and the work pieces 42 and 44. A head portion 50 is formed integrally with a trailing end of the shank portion for engaging one side of the work structure for preventing the body member 46 from passing entirely through the work structure. The head portion 50 is preferably provided with a peripheral axially extending resilient flange 54 which, when firmly engaged against the outer surface of the work piece 42, effectively provides a seal surrounding the work piece apertures for resisting the passage of any foreign material through the apertures.

The body member 46 is provided with central axially extending aperture means 56 which extends through both the shank portion 48 and the head portion 50. It is to be noted that, in addition to a central core, the aperture means 56 comprises radial slots 58, 60 and 62 which open at the periphery of the shank portion 48 and thus divide the shank portion into a plurality of resilient shank elements 64, 66 and 68. For the purpose discussed in detail below, it is further important to note that in accordance with the present invention the slot portions 58, 60 and 62 of the aperture means have substantially the same radial extent in the head portion 50 as in the shank portion 48 of the body member 46. In addition, the slot portion 58 is defined by generally opposing internal surfaces 70 and 72 of the shank elements 64 and 68, which surfaces converge from the head portion 50 toward the entering ends of the shank elements. The slots 60 and 62 are substantially identically formed so that their widths remain substantially constant through the head portion 50 and then are progressively reduced toward the entering end of the shank portion by pairs 74—76 and 78—80 of opposing converging surfaces of the shank elements.

The device 40 also includes a drive pin member 82 which may be formed from plastic or any other suitable material. The drive pin is provided with a length similar to the overall length of the body member 46 and with a transverse cross section substantially complementary to the transverse cross section of the aperture means 56 in at least the head portion 50 of the body member. Thus, in the embodiment shown, the drive pin has a generally Y-shaped cross section and is provided with flanges 84, 86 and 88 adapted to enter and substantially completely fill the slots 58, 60 and 62.

In this embodiment, the shank portion 48 of the body member is provided with a circular peripheral configuration complementary to the apertures through the workpieces and with a substantially uniform external diameter throughout its length. This enables the shank portion to be easily inserted into the work structure as shown in FIG. 5. Assembly may be further facilitated by rounding the entering end of the shank, if desired. Then in order to complete the assembly of the device 40 with the work structure, the drive pin 82 is inserted into the open end of the aperture means 56 at the head portion and then forced into the shank portion until the outer end of the drive pin is flush with or beneath the outer surface of the head portion 50. Since the thickness of each of the flanges of the drive pin is substantially equal to the width of each of the aperture means slots in the head portion, the drive pin flanges will engage the opposing pairs of internal converging surfaces of the shank portion to expand the shank portion radially outwardly for aggressive engagement with the work structure as shown in FIGS. 6 and 9. It is important to note that the drive pin substantially completely fills a transverse cross section of the aperture means 56 and more particularly the slot portions thereof so that all portions of the flexible or resilient shank elements are positively urged outwardly by the wedging action of the drive pin in the manner indicated by the force diagram provided by the arrows in FIG. 9. Thus substantially the entire peripheries of the shank elements are aggressively urged and retained against the work structure so as to provide the device with materially improved holding power.

FIGS. 3 and 4 show a slightly modified drive pin structure which is similar to the drive pin 82 as indicated by the application of identical reference numerals with the suffix a added to corresponding elements. This drive pin includes a head portion 100 having a peripheral axially extending flange 102 for engaging the head of the complementary body member with which the drive pin is used for sealing the aperture through the body member. Means in the form of a protuberance 101 which is shown on a depression which is not shown, is provided at the outer end of the pin for engagement with complementary means on a driving tool, not shown, for preventing the tool from slipping. This means 101 could also be provided on the other drive pins disclosed herein. It will be appreciated that this drive pin may be adapted for use with any of the body members disclosed herein.

FIGS. 7 and 8 show another embodiment of the present invention which is similar to the structure described above as indicated by the application of identical reference numerals with the suffix b added to corresponding elements. This embodiment differs in that the drive pin 82b is initially integrally joined to the head portion 50b of the body member 46b along a narrow junction 104. The junction 104 is easily broken by the force used to drive the pin 82b into the aperture means of the body member 46b. It will be appreciated that this embodiment eliminates the need for separate handling of the main fastener or body member and the drive pin.

FIG. 10 shows another slightly modified form of the present invention. In this embodiment the outer surface of each of the resilient shank elements is provided with a first section 106 flaring outwardly from the head portion and an inwardly tapering entering end section 108. The outwardly flaring sections 106 provide shoulder means which may be collapsed during insertion of the shank element through a work structure aperture and which then spring outwardly for engagement with the rear surface of the work structure. It will be appreciated that the drive pin 82c may be formed either separately from or integral with the main body member 46c.

In FIGS. 11–14 there is shown another embodiment of the present invention which is similar to the structures described above as indicated by the application of identical reference numerals with the suffix d added to corresponding elements. In this embodiment the device is particularly adapted for securing a molding strip 110 or the like to an apertured panel. Thus the head portion 50d of the main body or anchor member 46d is elongated so as to traverse the molding strip 110 and includes opposite end surfaces 112 and 114 for overlying and retaining inturned marginal flanges 116 and 118 of the molding strip. In order to prevent moisture, dirt and the like from passing through the aperture in the workpiece, the head portion 50d is provided with an annular axially extending resilient flange 120 surrounding the shank portion and spaced inwardly from the periphery of the head portion so as to avoid interference with the molding strip. Preferably the head portion 50d is provided with stops or abutments 121 and 123 which project a distance only slightly less than the flange 120 so as to limit the amount the flange can be deflected upon aggressive engagement with the workpiece. It has been found that the flange 120 provides the most effective seal when it projects about .008 to .010 inch beyond the stops. The head portion 50d is provided with a flat outer surface 122 surrounding the outer open end of the aperture means 56d for cooperating with the sealing flange 102d on the head of the drive pin 82d. Preferably, the head portion 50d is provided with arched outwardly projecting flanges 124 and 126 at opposite sides of the flat central surface 122 for snugly fitting within the molding strip so that the strip will be more securely fixed with respect to the moulding clip.

FIGS. 16–19 show a method of producing the embodiment shown in FIGS. 11–14 and it will be appreciated that this method may also be followed with certain of the other embodiments disclosed herein. More specifically, the main clip or body members may be formed in a multiple cavity mold so that they are arranged in a predetermined pattern and so that they are connected with each other by runners 128, 130 and 132. One pattern in which the moulding clips may be arranged is shown in FIG. 16. The drive pins are molded in an identical pattern and are connected by runners 134 and 136, and 138 as shown in FIG. 17. It will be appreciated that these parts may be easily and economically formed in relatively simple molds. In order to minimize handling problems and costs after the drive pins and clip members are molded, the drive pins are partially inserted into the clip members. This may be quickly and economically accomplished in the manner indicated in FIGS. 18 and 19. More specifically, the drive pins are arranged over and axially aligned with the clip members as shown in FIG. 18 while the parts are still interconnected with each other by the runners. Before this is done, however, the anchor members are properly positioned on a suitable support plate 140 of a punch press or the like as indicated in FIG. 19 so that the runners 128 overlie suitably positioned knife blades 142. An assembly which is complementary to the knife blades 142 is positioned over the runners 128, which assembly may include a shearing plate 144 cooperable with the knife blades 142, another similar shearing plate 146 cooperable with additional knife blades 148 which serve to sever the runners 134 from the drive pins, and a rubber or resilient block 150 between the shear plates. After the shear plates are properly positioned, the drive pins are positioned over the clips. The blades 148 are carried by a suitable ram 152 which is then lowered for forcing the ends of the drive pins into the aperture means in the clip members and for substantially simultaneously shearing the runners from the drive pins and the clip members.

FIG. 15 shows another slightly modified form of the present invention which is constructed so as to eliminate separate handling of the fastener clip member and the drive pin. In this embodiment a drive pin is integrally connected with the clip member by means of a strap 154. It will be noted that the strap 154 extends between the head of the clip member and the head of the drive pin and that, at least initially, the drive pin extends oppositely from the shank portion of the clip member. The strap 154 is of sufficient length so that it may be bent to enable the entering end of the drive pin to be inserted into the aperture means in the clip member.

In FIGS. 20–22 there is shown another modified form of the present invention which is similar to the structures described above as indicated by the application of identical reference numerals with the suffix $f$ added to corresponding elements. It will be noted that, in this embodiment, the aperture means 56f which extends through the head and shank portions of the main body member 46f is generally rectangular in cross sectional configuration and the drive pin 82f is also rectangular in cross sectional configuration. However, as shown in FIGS. 20 and 21, the pairs of opposing internal surfaces 74f—76f and 80f—82f are inclined toward each other both longitudinally and transversely of the shank elements. Thus when the drive pin 82f is inserted into and fully fills the aperture means 56f, the longitudinally extending corner portions of the shank elements will be laterally expanded in the manner indicated in broken lines for improved holding power. It is further to be noted that the pin 82f is provided with a rearwardly and outwardly projecting thin flexible flange 155 adjacent its trailing end. This flange is circumferentially continuous for engaging the wall of the aperture means 56f and providing a seal. The other pins disclosed herein could be provided with similar sealing flange means, if desired.

Another embodiment of the present invention is shown in FIGS. 23, 24 and 26, which embodiment is similar to the structures described above as indicated by the application of identical reference numerals with the suffix $g$ added to corresponding elements. In this embodiment the aperture means 56g is provided with a generally cruciform cross section with the central portion thereof enlarged so as to increase the flexibility of the shank elements. The drive pin 82g is provided with a complementary cruciform cross sectional shape.

The device 40h shown in FIG. 25 is identical to the embodiment shown in FIGS. 23, 24 and 26 except that the pairs of opposing surfaces 74h—76h and 80h—82h are inclined toward each other transversely of the shank element as well as longitudinally. This arrangement causes the relatively thin side portions of the shank elements to expand, in the position shown in the drawing, horizontally as well as vertically as indicated by the broken lines when the drive pin is fully inserted.

FIGS. 27–30 show another embodiment of the present invention which is similar to the structure described above as indicated by the application of identical reference numerals with the suffix $i$ added to corresponding elements. In this embodiment the central aperture means 56i includes only a single slot portion opening at only one side of the shank of the main body member. The drive pin 82i is complementary in transverse cross section to the aperture means and thus is provided with a single flange 84i for entering the slot 58i and expanding the shank portion in the manner shown in FIG. 30. The drive pin 82i is shown formed integrally with the main body member, but it is to be understood that the drive pin may also be formed separately from the body member if desired. This embodiment illustrates a feature which could also be applied to the other forms disclosed herein. More specifically, a thin stretchable membrane 157 is provided for sealing the side of the shank without adversely affecting the manner in which the shank is expanded for engagement with the workpiece.

FIG. 31 shows a device 40j which is similar to the device shown in FIGS. 27–30 except that the central aperture means has a generally rectangular cross section through the head portion 50j and a similar transverse cross section through the shank portion. However, the section of the aperture means in the shank portion is defined by opposing surfaces which are inclined toward each other transversely of the shank portion as well as longitudinally thereof so that when a complementary rectangular drive pin is inserted, the shank portion will be expanded in the manner indicated in broken lines.

FIG. 32 shows a device 40k which is similar to the device 40f shown in FIGS. 20–22. However, in this embodiment the shank portion of the main body member is provided with circular rather than a rectangular exterior shape so that when the rectangular drive pin is inserted, the shank portion will be expanded in the manner shown in broken lines.

In FIGS. 33–37 there is shown a further embodiment of the present invention which is similar to the structure described above as indicated by the application of identical reference numerals with the suffix *l* added to corresponding elements. In this embodiment the structure is such that the drive pin 82l is adapted to be inserted through the entering end of the shank portion 48l of the main body member or clip 46l rather than through the head portion of the clip. Furthermore, the drive pin is constructed so that it is adapted to be pulled rather than pushed into the aperture means. More specifically, the drive pin 82l is provided with an elongated reduced diameter stem 160 adapted to be inserted through the aperture means 56l. The stem is provided with a plurality of radially projecting shoulders 162 and 164. The length of the stem is such that at least one of these shoulders will be located beyond the outer surface 122l of the clip member when the stem is inserted through the aperture means 56l and before the flanges of the drive pin aggressively engage the opposing surfaces defining the slots and the shank portion 48l of the moulding clip. This enables the shoulder to be engaged by a suitable pulling tool such as the tool 166 shown in FIG. 36, which tool may be used for pulling the pin member 82l into the aperture 56l. After the pin is fully assembled, the projecting portion of the stem 160 may be severed by any suitable means such as the cutting tool 168 which may be combined with the pulling tool. Since these tools form no part of the present invention they need not be described in detail. However, one of the protruding shoulders may be left for engagement with inwardly projecting resilient annular flange means 169 for resisting retrograde movement of the pin. This flange means may be dome shaped or dished outwardly and/or it may be radially slotted for facilitating passage of the shoulders 160 and 162 outwardly therethrough.

In this embodiment the open end of the aperture means and more particularly the open ends of the slots in the shank portion 48l are enlarged to facilitate initial entry of the pin 82l. However, except for the enlarged mouths, the slots are substantially uniform in width throughout. Thus in order to obtain the wedging and expanding action, the flanges 84l, 86l, and 88l of the pin are defined by divergent surfaces or, in other words, these flanges are wedge shaped. It is to be understood that, if desired, the drive pins described above could also be tapered or wedge shaped and in such instances the opposing slot surfaces of the above described main body or clip members could be parallel to each other. As shown best in FIG. 36, the stem 160 also includes an additional annular shoulder 170 which faces the trailing end of the pin 82l. This shoulder provides an annular edge 172 adapted to bite into the wall of the portion of the aperture means 56l in the head section of the clip member so as further to resist retrograde movement of the fully assembled pin.

While the preferred embodiments of this invention have been shown and described herein, it is obvious that many structural details may be changed without departing from the spirit and scope of the appended claims.

The invention is claimed as follows:

1. A device of the type described comprising a one-piece body member of tough resilient plastic material including a shank insertable into an apertured work structure and enlarged laterally projecting and peripherally continuous head means integrally joined with a trailing end of said shank and engageable with one side of the work structure, aperture means extending axially through said head means and axially into said shank and providing slot means extending through said head means and in said shank, said slot means including at least three angularly offset sections of predetermined radial extent substantially opening at angularly and substantially equally peripherally spaced side portions of said shank, said slot means sections extending axially through said head, said slot means sections converging from said side portions toward a central longitudinal axis of said device and joining each other centrally of said device, each of said slot means sections being defined by generally longitudinally extending opposed surfaces which converge with respect to each other toward an entering end of said shank, and pin means insertable into said aperture means through said head means and then into said shank and including at least three sections insertable through said head means and into all of said slot means sections, said pin means sections being complementary to and wider than said slot means sections for positively spreading said surfaces and expanding the shank for engagement with the work structure for resisting withdrawal of the shank from the work structure, said pin means sections having substantially the same radial extent as said slot means sections.

2. A device, as defined in claim 1, wherein said pin means has its entering end initially integrally connected with a trailing end of said head means along a junction which is broken when the pin means is inserted into said aperture means.

3. A device, as defined in claim 1, wherein each of said pin means sections has a generally rectangular transverse cross section, and said slot means portion in said head means has a substantially complementary transverse cross section.

4. A device, as defined in claim 1, wherein said pin means includes a radially extending head portion at a trailing end thereof providing an annular axially extending flange engageable with said first mentioned head means for providing a seal around said aperture means.

5. A device, as defined in claim 1, which includes an elongated flexible strap integrally connecting a trailing end of said pin means with said body member, said strap being bendable for permitting insertion of an entering end of said pin means into said aperture means.

6. A device as defined in claim 1, wherein said aperture means has a generally Y-shaped transverse cross section and said pin means has a substantially complementary Y-shaped cross section.

References Cited in the file of this patent

UNITED STATES PATENTS

| | | |
|---|---|---|
| 894,580 | Blakey | July 28, 1908 |
| 964,976 | Kukuruda | July 19, 1910 |
| 1,104,544 | Raeger | July 21, 1914 |
| 1,202,159 | Camden | Oct. 24, 1916 |
| 1,234,487 | Raeger | July 24, 1917 |
| 1,437,926 | Butts | Dec. 5, 1922 |
| 2,306,460 | Meyer et al. | Dec. 29, 1942 |
| 2,440,038 | Baker et al. | Apr. 20, 1948 |
| 2,465,656 | Morin | Mar. 29, 1949 |
| 2,531,270 | Hood | Nov. 21, 1950 |
| 2,657,894 | Sklenar | Nov. 3, 1953 |
| 2,668,468 | Flogaus | Feb. 9, 1954 |
| 2,825,258 | McCabe et al. | Mar. 4, 1958 |
| 2,876,499 | Schultz | Mar. 10, 1959 |
| 2,898,798 | Carno | Aug. 11, 1959 |
| 2,937,834 | Orenick et al. | May 24, 1960 |
| 2,969,216 | Hallsey | Jan. 24, 1961 |

FOREIGN PATENTS

| | | |
|---|---|---|
| 24,883 | Great Britain | Dec. 14, 1899 |
| 365,864 | Great Britain | Jan. 28, 1932 |
| 918,504 | France | Feb. 11, 1947 |
| 642,252 | Great Britain | Aug. 30, 1950 |
| 821,412 | Germany | Nov. 19, 1951 |